US010576945B2

(12) United States Patent
Sung et al.

(10) Patent No.: US 10,576,945 B2
(45) Date of Patent: Mar. 3, 2020

(54) VEHICLE AND METHOD FOR CONTROLLING THE SAME

(71) Applicants: Hyundai Motor Company, Seoul (KR); Kia Motors Corporation, Seoul (KR)

(72) Inventors: DongHyun Sung, Hwaseong-si (KR); Taeyoung Lee, Yongin-si (KR); Sangmin Lee, Seoul (KR); Eungseo Kim, Suwon-si (KR); Yongseok Kwon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 224 days.

(21) Appl. No.: 15/796,426

(22) Filed: Oct. 27, 2017

(65) Prior Publication Data
US 2019/0016316 A1 Jan. 17, 2019

(30) Foreign Application Priority Data
Jul. 13, 2017 (KR) .......................... 10-2017-0088814

(51) Int. Cl.
*B60T 7/22* (2006.01)
*G08G 1/16* (2006.01)
(Continued)

(52) U.S. Cl.
CPC .................. *B60T 7/22* (2013.01); *B60T 8/17* (2013.01); *B60T 17/22* (2013.01); *G01S 13/42* (2013.01);
(Continued)

(58) Field of Classification Search
CPC ... B60T 7/22; B60T 8/17; B60T 17/22; B60T 2201/022; B60T 2210/32; G08G 1/165;
(Continued)

(56) References Cited

U.S. PATENT DOCUMENTS 8,600,606 B2   12/2013  Nickolaou et al.
8,643,483 B2 *  2/2014  Oh ...................... B60R 16/0234
                                                              340/438

(Continued)

FOREIGN PATENT DOCUMENTS

JP    2004-268829 A    9/2004
JP    2008-282097 A   11/2008
JP    2011-257984 A   12/2011

*Primary Examiner* — Jerrah Edwards
(74) *Attorney, Agent, or Firm* — Morgan, Lewis & Bockius LLP

(57) ABSTRACT

A vehicle may a capturer configured to capture an object around the vehicle to detect the object, a detector configured to obtain at least one of position information and speed information related to the object, and a controller configured to determine a collision avoidance control area for the object based on the at least one of position information and speed information related to the object, change the determined collision avoidance control area based on information related to a surrounding condition of a road on which the vehicle is being driven, and change at least one of time to send a signal to warn of a collision with the object and an amount of braking of the vehicle based on the changed collision avoidance control area.

21 Claims, 13 Drawing Sheets

(51) Int. Cl.
*B60T 8/17* (2006.01)
*G01S 13/931* (2020.01)
*G01S 13/58* (2006.01)
*G01S 13/42* (2006.01)
*G01S 13/86* (2006.01)
*B60T 17/22* (2006.01)
*G01S 13/93* (2020.01)
*G01S 7/41* (2006.01)
*G01S 15/931* (2020.01)

(52) U.S. Cl.
CPC .......... *G01S 13/589* (2013.01); *G01S 13/867* (2013.01); *G01S 13/931* (2013.01); *G08G 1/165* (2013.01); *G08G 1/166* (2013.01); *B60T 2201/022* (2013.01); *B60T 2210/32* (2013.01); *G01S 7/415* (2013.01); *G01S 15/931* (2013.01); *G01S 2013/936* (2013.01); *G01S 2013/9321* (2013.01); *G01S 2013/9346* (2013.01); *G01S 2013/9353* (2013.01); *G01S 2013/9364* (2013.01); *G01S 2013/9367* (2013.01); *G01S 2013/9375* (2013.01)

(58) Field of Classification Search
CPC ......... G08G 1/166; G01S 7/415; G01S 13/42; G01S 13/589; G01S 13/867; G01S 13/931; G01S 2013/9321; G01S 2013/9346; G01S 2013/9353; G01S 2013/936; G01S 2013/9364; G01S 2013/9367; G01S 2013/9375; G01S 15/931

See application file for complete search history.

(56) References Cited

U.S. PATENT DOCUMENTS

| | | | |
|---|---|---|---|
| 9,290,178 B2 | 3/2016 | Sakima et al. | |
| 9,815,459 B2* | 11/2017 | Sasabuchi | B60W 30/08 |
| 2012/0119897 A1* | 5/2012 | Oh | B60R 16/0234 |
| | | | 340/457.4 |
| 2016/0185345 A1* | 6/2016 | Sasabuchi | B60W 30/08 |
| | | | 701/301 |

* cited by examiner

200:200a,200b,200c

VEHICLE AND METHOD FOR CONTROLLING THE SAME

CROSS-REFERENCE(S) TO RELATED APPLICATIONS

The present application claims priority to Korean Patent Application No. 10-2017-0088814, filed on Jul. 13, 2017, the entire contents of which is incorporated herein for all purposes by this reference.

BACKGROUND OF THE INVENTION

Field of the Invention

The present invention relates to a vehicle and method for controlling the same, and, more particularly, to a technology to effectively perform collision avoidance control against an object by accounting for surrounding conditions of a road on which the vehicle is being driven to change a collision avoidance control area of the vehicle, which is determined based on a moving direction and moving speed of the object.

Description of Related Art

Vehicles are driven on roads or tracks to transport occupants or goods to various destinations. The vehicle is able to move to various locations on one or more wheels mounted onto a frame of the vehicle. Such vehicles may be classified into three- or four-wheel vehicles, a two-wheel vehicle including a motorcycle, construction machinery, bicycles, trains traveling along rails on the tracks, and the like.

In modern society, vehicles are the most common transportation means, and persons using the vehicles are ever increasing. With the development of automobile technology, persons are capable of moving a long distance without exerting much effort, making their lives more convenient, etc., but problems often arise wherein traffic conditions worsen and traffic jams are intensified where population densities are high.

To relieve the above burdens and increase convenience of a driver, recent studies regarding vehicles disposed with an Advanced Driver Assist System (ADAS) which actively provides information related to a state of the vehicle, a state of the driver, and the surrounding conditions are actively ongoing.

As an example of the ADAS disposed in the vehicle, there are a Forward Collision Avoidance (FCA) system and an Autonomous Emergency Brake (AEB) system. These systems are collision avoidance systems that determine the risk of colliding with vehicles in the opposite direction or at the crossroads, and actuate urgent braking in the sudden situation of the collision.

Recently, a technology has been highly regarded which changes a collision avoidance control area against an object and accordingly, control a time to send a collision warning signal or an amount of braking applied to the vehicle by accounting for conditions of a road on which the vehicle is being driven.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to effectively perform a collision avoidance control against an object by accounting for a surrounding condition of a road on which a vehicle is being driven to change a collision avoidance control area.

In accordance with an aspect of the present invention, a vehicle may include a capturer configured to capture an object around the vehicle to detect the object; a detector configured to obtain at least one of position information and speed information related to the object; and a controller configured to determine a collision avoidance control area for the object based on the at least one of position information and speed information related to the object, change the determined collision avoidance control area based on the information related to a surrounding condition of a road on which the vehicle is being driven, and change at least one of a time to send a signal to warn of a collision with the object and an amount of braking applied to the vehicle based on the changed collision avoidance control area.

The controller may determine the collision avoidance control area based on at least one of a moving direction, lateral moving speed, and longitudinal moving speed of the object.

The controller, based on the information related to the surrounding condition of the road on which the vehicle is being driven, may reduce the determined collision avoidance control area when the information related to the surrounding condition of the road on which the vehicle is being driven corresponds to a first condition, and expand the determined collision avoidance control area when the information related to the surrounding condition of the road corresponds to a second condition.

The controller may determine the information related to the surrounding condition to be the first condition when an area on the road on which the vehicle is being driven, into which the object may move, is smaller than a predetermined threshold.

The controller may determine the information related to the surrounding condition to be the first condition when there is a guardrail on the road on which the vehicle is being driven or when the road is a highway or freeway.

The controller may determine the information related to the surrounding condition to be the second condition when an area on the road on which the vehicle is being driven, into which the object may move, is greater than the predetermined threshold.

The controller may determine the information related to the surrounding condition to be the second condition when there is a crosswalk on the road on which the vehicle is being driven or when there is at least one of a sidewalk and a school zone around the road.

The controller may change the time to send the signal to warn of a collision with the object to be later than a predetermined point in time when the collision avoidance control area is reduced, and change the time to send the signal to warn of a collision with the object to be earlier than the predetermined point time when the collision avoidance control area is expanded.

The controller may change an amount of applied braking to control a driving speed of the vehicle to be less than a predetermined value when the collision avoidance control area is reduced, and change the amount of applied braking to control the driving speed of the vehicle to be greater than the predetermined value when the collision avoidance control area is expanded.

The detector may obtain information related to the surrounding condition of the road on which the vehicle is being driven.

The vehicle may further include: a communication device configured to receive information related to the surrounding condition of the road on which the vehicle is being driven from a Car Ubiquitous System (CUbiS) center.

The vehicle may further include: a storage configured to store information related to the surrounding condition of the road on which the vehicle is being driven.

In accordance with another aspect of the present invention, a method for controlling a vehicle may include capturing an object around the vehicle to detect the object; obtaining at least one of position information and speed information related to the object; determining a collision avoidance control area for the object based on the at least one of position information and speed information related to the object; changing the determined collision avoidance control area based on information related to a surrounding condition of a road on which the vehicle is being driven; and changing at least one of time to send a signal to warn of a collision with the object and an amount of braking applied to the vehicle based on the changed collision avoidance control area.

The determining of a collision avoidance control area for the object may include: determining the collision avoidance control area based on at least one of a moving direction, lateral moving speed, and longitudinal moving speed of the object.

The changing of the determined collision avoidance control area may include: based on the information related to the surrounding condition of the road on which the vehicle is being driven, reducing the determined collision avoidance control area when the information related to the surrounding condition of the road on which the vehicle is being driven corresponds to a first condition, and expanding the determined collision avoidance control area when the information related to the surrounding condition of the road corresponds to a second condition.

The first condition may be determined by determining the information related to the surrounding condition to be the first condition when an area on the road on which the vehicle is being driven, into which the object may move, is smaller than a predetermined threshold.

The first condition may be determined by determining the information related to the surrounding condition to be the first condition when there is a guardrail on a road on which the vehicle is being driven or when the road is a highway or freeway.

The second condition may be determined by determining the information related to the surrounding condition to be the second condition when an area on a road on which the vehicle is being driven, into which the object may move, is greater than a predetermined threshold.

The second condition may be determined by determining the information related to a surrounding condition to be the second condition when there is a crosswalk on the road on which the vehicle is being driven or when there is at least one of a sidewalk and a school zone around the road.

The changing of the time to send a signal to warn of a collision with the object may include: changing the time to send a signal to warn of a collision with the object to be later than a predetermined point in time when the collision avoidance control area is reduced, and changing the time to send a signal to warn of a collision with the object to be earlier than the predetermined point in time when the collision avoidance control area is expanded.

The changing of an amount of braking applied to the vehicle may include: changing an amount of applied braking to control the driving speed of the vehicle to be less than a predetermined value when the collision avoidance control area is reduced, and changing the amount of applied braking to control the driving speed of the vehicle to be greater than the predetermined value when the collision avoidance control area is expanded.

The method may further include: obtaining information related to a surrounding condition of a road on which the vehicle is being driven.

The method may further include: receiving information related to a surrounding condition of a road on which the vehicle is being driven from a vehicle Ubiquitous System (CUbiS) center.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
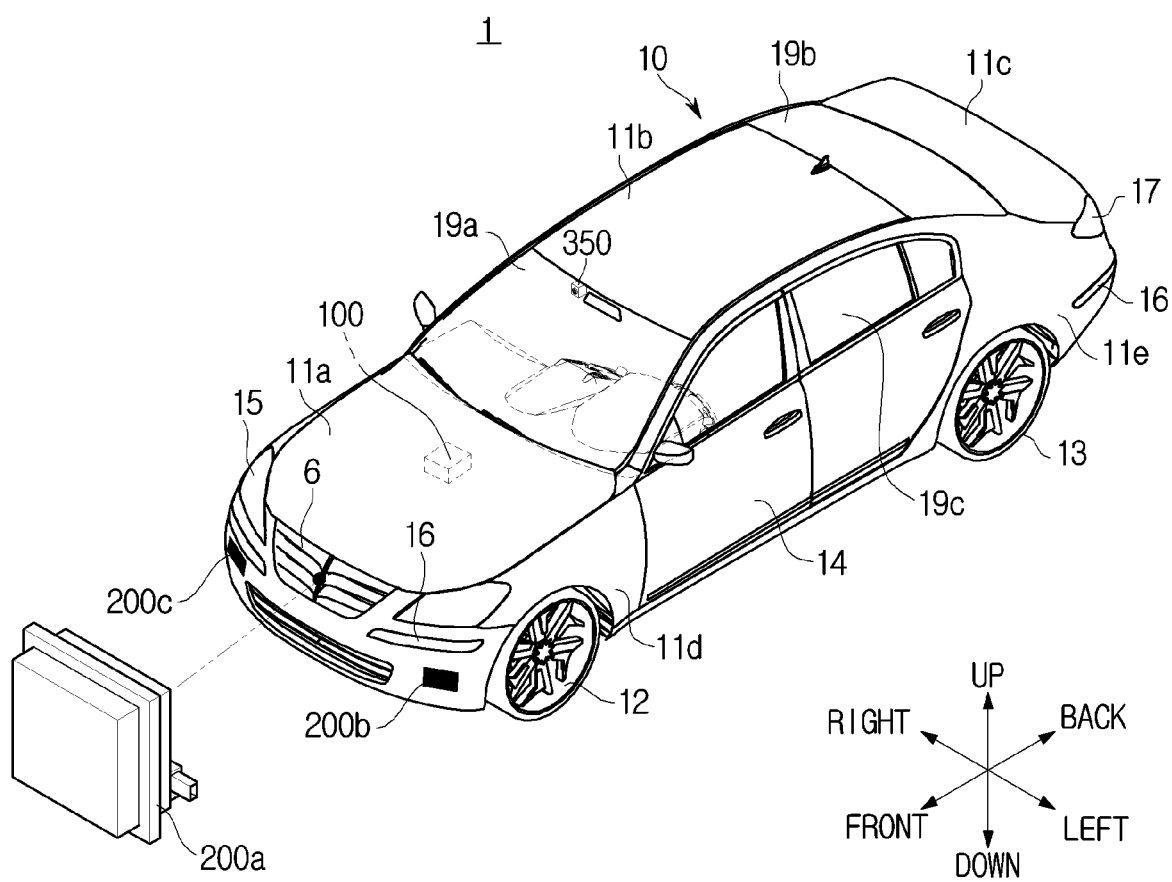
FIG. 1 is a perspective view schematically illustrating an external of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is note intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Not all elements of exemplary embodiments of the present invention will be described, and description of what are commonly known in the art or what overlap each other in the exemplary embodiments will be omitted. The terms as used throughout the specification, including "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, omitted elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

Figure 2:
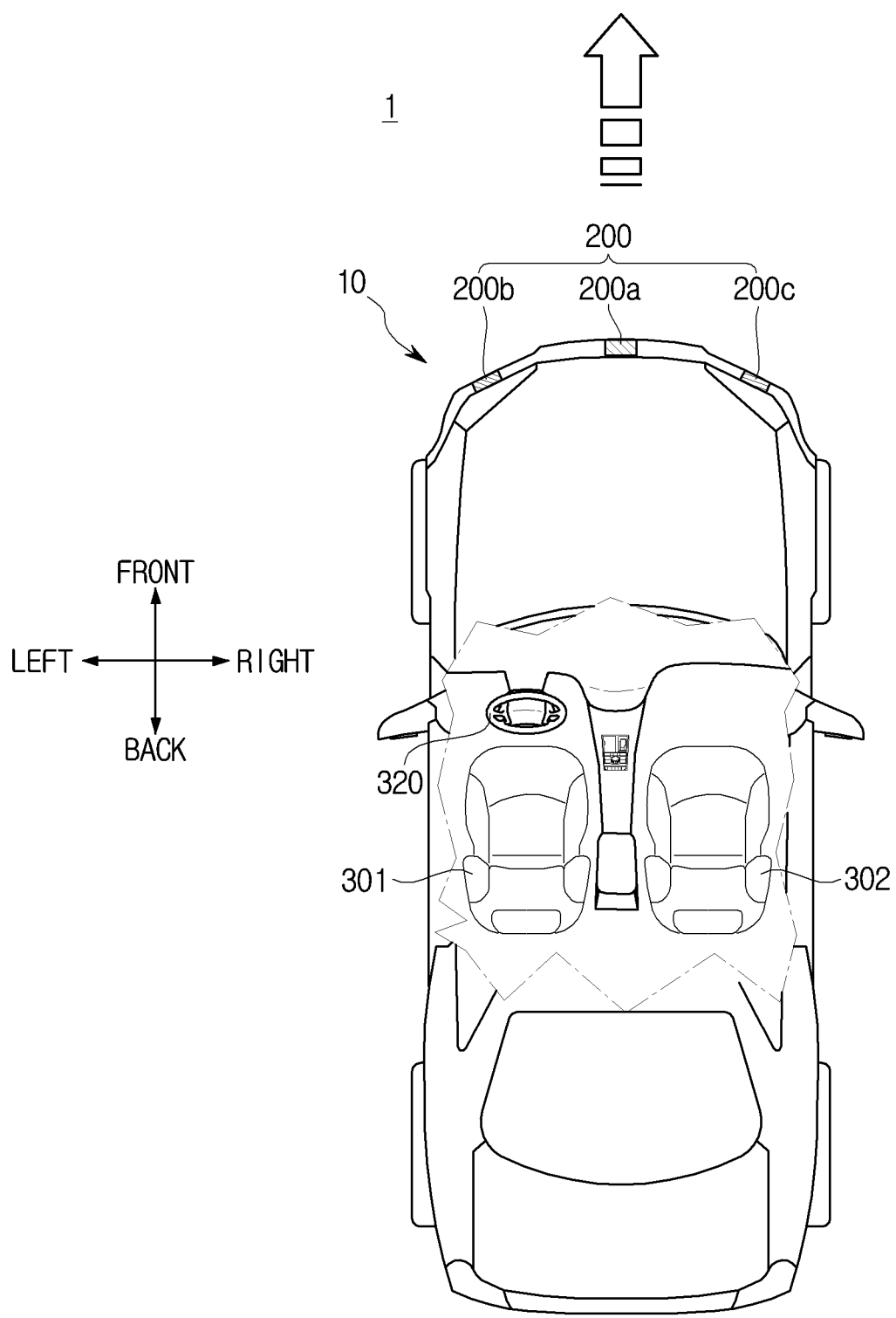
FIG. 2 shows a vehicle disposed with detectors for detecting vehicles behind and to sides of the vehicle according to an exemplary embodiment of the present invention.
Figure 3:
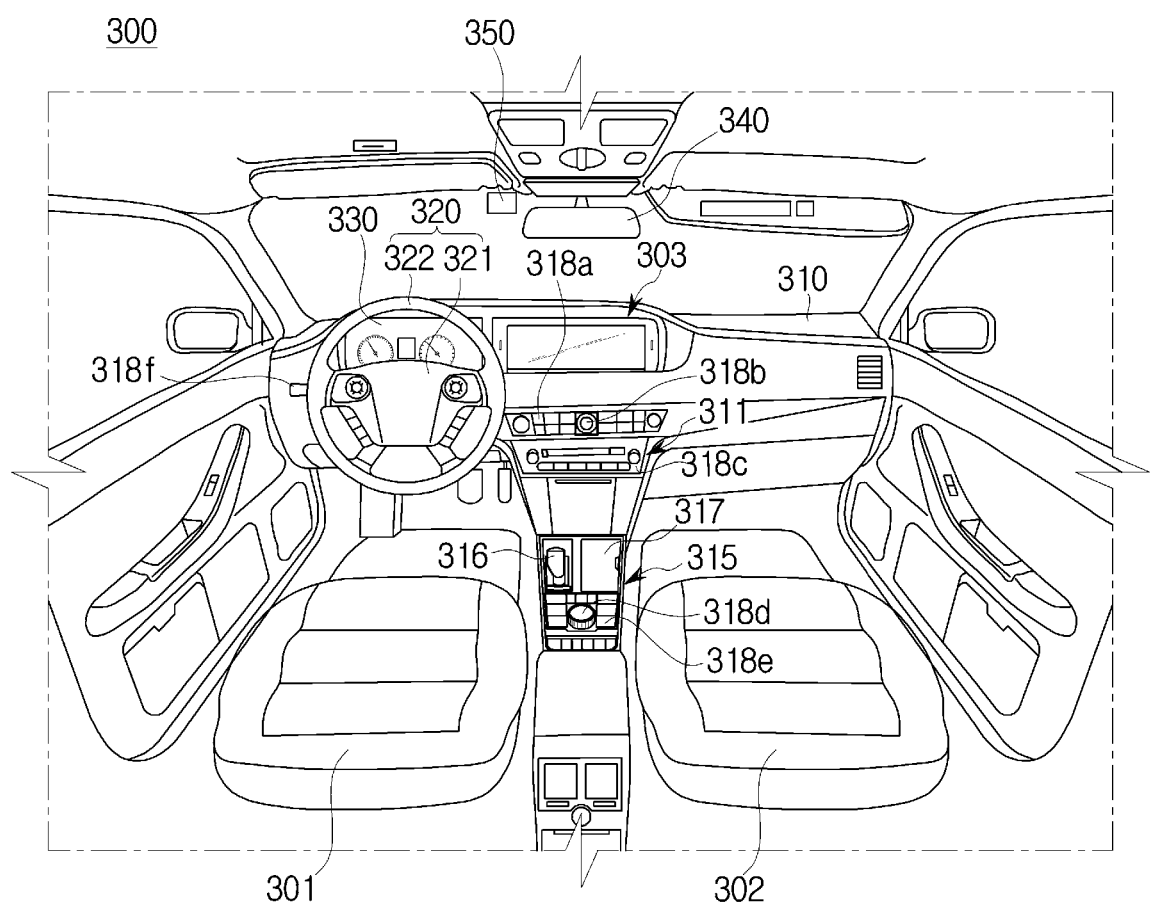
FIG. 3 shows internal features of a vehicle according to an exemplary embodiment of the present invention.
Figure 4:
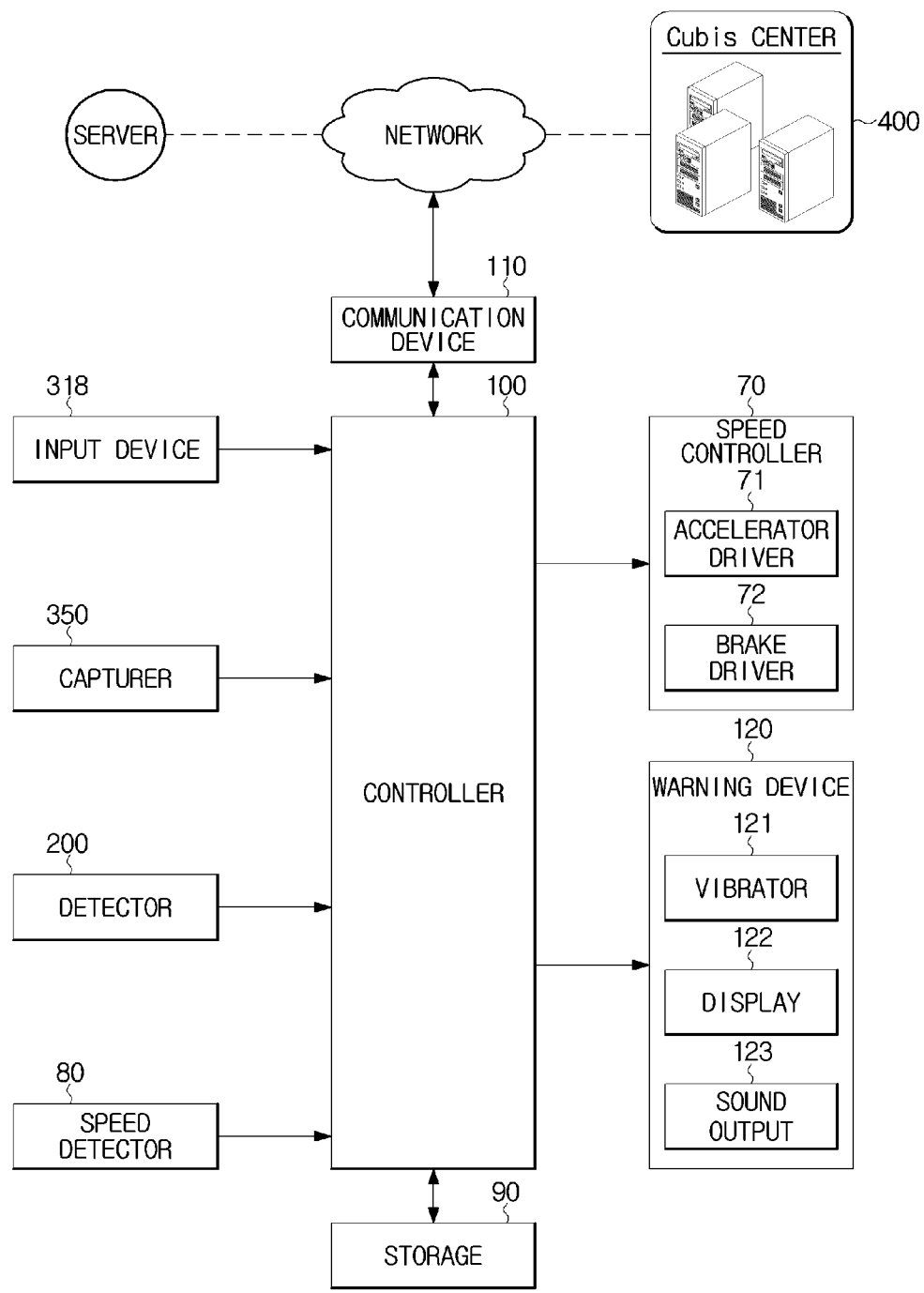
FIG. 4 is a control block diagram of a vehicle according to an exemplary embodiment of the present invention.

FIG. 1 is a perspective view schematically illustrating an exterior of a vehicle according to an exemplary embodiment of the present invention. FIG. 2 shows a vehicle disposed with detectors for detecting vehicles behind and to sides of the vehicle according to an exemplary embodiment of the present invention, FIG. 3 shows internal features of the vehicle according to an exemplary embodiment of the present invention, and FIG. 4 is a control block diagram of the vehicle according to an exemplary embodiment of the present invention.

For convenience of explanation, as shown in FIG. 1, a direction in which a vehicle 1 advances is called a forward direction, and left and right directions are distinguished based on the forward direction thereof. When the forward direction corresponds to a twelve o'clock position, the right direction is defined to correspond to a three o'clock position or approximately the three o'clock position, and the left direction is defined to correspond to a nine o'clock position or approximately the nine o'clock position. An opposite direction of the forward direction is a rear direction thereof. Also, a direction down to a floor of the vehicle 1 is called a downward direction, and a direction opposite to the downward direction is called an upward direction thereof. Furthermore, a side located ahead of the vehicle 1 is called a front side, a side located behind the vehicle 1 is called a rear side, and sides located on either side of the vehicle 1 are called sides. The sides include left and right sides.

Referring to FIG. 1, a vehicle 1 may include a vehicle body 10 that forms the external of the vehicle 1, and wheels 12, 13 for moving the vehicle 1.

The vehicle body 10 may include a hood 11a for protecting various devices required for driving the vehicle 1, a roof panel 11b that forms an internal compartment of the vehicle 1, a trunk lid 11c of a trunk, front fenders 11d positioned on the sides of the vehicle 1, and quarter panels 11e. There may be a plurality of doors 14 positioned on the sides of the vehicle body 10 and hinged with the vehicle body 10.

A front window 19a interposes the hood 11a and the roof panel 11b for providing a forward field of view from the vehicle 1, and a rear window 19b interposes the roof panel 11b and the trunk lid 11c for providing a rearward field of view behind the vehicle 1. Side windows 19c may also be disposed into the upper portion of the doors 14 to provide side views.

Headlamps 15 may be positioned on the front of the vehicle 1 for illuminating a direction in which the vehicle 1 advances.

Turn signal lamps 16 may also be positioned on the front and rear of the vehicle 1 for indicating a direction to which the vehicle 1 is going to make a turn.

The vehicle 1 may blink the turn signal lamp 16 to indicate a direction of turning. Tail lamps 17 may also be positioned on the rear of the vehicle 1. The tail lamps 17 may indicate a state of gear shift, a state of brake operation of the vehicle 1, etc.

As shown in FIG. 1 and FIG. 3, at least one capturer 350 may be positioned within the vehicle 1. The capturer 350 may capture an image around the vehicle 1 while the vehicle is being driven or stopped, and further obtain information related to a type and a position of the object. The object captured around the vehicle 1 may include another vehicle, pedestrian, bicycle, etc., and further include a moving object or various fixed obstacles.

The capturer 350 may detect the type of the object around the vehicle 1 by capturing the object and identifying a shape of the captured object through image recognition, and send the detected information to the controller 100.

As the object moves around the vehicle 1, the coordinates and moving speed of the object may vary in real time, and as the vehicle 1 moves as well, the position and speed thereof may vary in real time. The capturer 350 may detect the object by capturing an image of the object in real time when the object is moving around.

While FIG. 3 shows the capturer 350 positioned around a rear-view mirror 340 the present invention is not limited thereto. For instance, the capturer 350 may be disposed at any internal or external position of the vehicle 1 that allows the capturer 350 to obtain image information.

The capturer 350 may include at least one camera, and further include a three dimensional (3D) space recognition detector, radar detector, ultrasound detector, etc., to capture a more accurate and precise image.

For the 3D space recognition detector, a KINECT (RGB-D detector), Time of Flight (Structured Light Sensor), stereo camera, or the like may be used, without being limited thereto, and any other devices having the similar function may also be used.

Referring to FIG. 1 and FIG. 2, the vehicle 1 may include a detector 200 for detecting an object in front of the vehicle 1 to obtain information related to at least one of position and moving speed of the object.

In an exemplary embodiment of the present invention, the detector 200 may obtain information related to coordinates of the object located around the vehicle 1 relative to the vehicle 1. In other words, the detector 200 may obtain the coordinate information in real time, which may vary as the object moves, and detect a distance between the vehicle 1 and the object. The detector 200 may also obtain information related to a speed at which the object around the vehicle 1 is moving.

The detector 200 may obtain information related to surrounding conditions (also, referred to as surrounding condition information) of the road on which the vehicle 1 is being driven. The surrounding condition information may include positions and shapes of various structures or obstacles located around the road on which the vehicle 1 is being driven, and other various information related to surroundings of the road, including traffic conditions of the road, surface conditions of the road, etc.

For example, the detector 200 may detect structures or obstacles located around the vehicle 1 while the vehicle 1 is being driven, and determine shapes and types of the detected structures or obstacles based on data stored in a storage 90.

The detector 200 may detect guardrails, pedestrian crossings (or crosswalks), sidewalks, school zones, etc., located on the road. There may be various device to detect information related to surrounding road conditions.

The detector 200 may be disposed in a proper position at which an object, e.g., another vehicle, located in front, to the side, or to the front side of the vehicle 1 may be recognized, as shown in FIG. 1 and FIG. 2. In an exemplary embodiment of the present invention, the detector 200 may be disposed on the front and both sides of the vehicle 1 to recognize all objects located in front of the vehicle 1, in a direction between the left side and front (hereinafter, referred to as front-left) of the vehicle 1 and in a direction between the right side and the front (front-right) of the vehicle 1.

For example, a first detector 200*a* may be disposed in a member, e.g., on the internal side of a radiator grill 6, or may be disposed at any position of the vehicle 1 which allows for detection of another vehicle in front of the vehicle 1. Furthermore, a second detector 200*b* may be positioned on a left side of the vehicle 1, and a third detector 200*c* may be positioned on a right side of the vehicle 1.

The detector 200 may detect whether another vehicle is present or approaching from the left side, right side, front-left side, or front-right side using electromagnetic waves or laser beams. For example, the detector 200 may emit electromagnetic waves including micro-waves or millimeter-waves, pulsed laser beams, ultrasounds, or infrared rays in the left, right, front, rear, front-left, front-right, rear-left, or rear-right direction, and detect whether there is an object by receiving electromagnetic waves, pulsed laser beams, ultrasounds, infrared rays, or the like, reflected or scattered from the object. In the present case, the detector 200 may further determine a distance between the vehicle 1 and the object or moving speed of the object based on a time taken for the emitted electromagnetic waves, pulsed laser beams, or infrared rays to be returned.

Alternatively, the detector 200 may detect whether there is an object by receiving visible rays reflected or scattered from the object located in the left, right, and front directions. As described above, depending on which one of electromagnetic waves, pulsed laser beams, ultrasounds, infrared rays, and visible rays is used, a recognized distance to the object located in front or rear of the vehicle 1 may be different, and local weather or illumination intensity may affect whether the object is recognized or not.

Taking the above into account, when the vehicle 1 is being driven in a certain direction along a certain lane, the controller 100 of the vehicle 1 may determine whether there are moving objects in front of the vehicle 1, and front-left and front-right sides to the vehicle 1, and obtain information related to the position and the speed of the object.

The detector 200 may be implemented with a plurality of various devices, including a radar using millimeter-waves or micro-waves, a Light Detection And Ranging (LiDAR) using pulsed laser beams, a vision using visible rays, an infrared detector using infrared rays, an ultrasound detector using ultrasounds, and/or the like. The detector 200 may be implemented with any one of the above devices or any combination thereof. When several detectors 200 are mounted on the vehicle 1, the detectors 200 may be implemented as the same type or different types of devices. The detectors 200 may be implemented with other various devices or combinations thereof that may be considered by the designer.

Referring to FIG. 3, in an internal 300 of the vehicle 1, there are a driver seat 301, a passenger seat 302 adjacent to the driver seat 301, a dashboard 310, a steering wheel 320, and an instrument panel 330.

The dashboard 310 refers to a panel that separates the internal compartment from the engine compartment and that has various members required for driving disposed thereon. The dashboard 310 is located in front of the driver seat 301 and passenger seat 302. The dashboard 310 may include a top panel, a center fascia 311, a gear box 315, and the like.

On the top panel of the dashboard 310, a display 303 may be disposed. The display 303 may present various information in the form of images to the driver or passenger of the vehicle 1. For example, the display 303 may visually present various information including maps, weather, news, various moving or still images, information regarding status or operation of the vehicle 1, e.g., information related to the air conditioner, etc. Furthermore, the display 303 may provide the driver or passenger with an alert corresponding to a level of danger to the vehicle 1, when the vehicle 1 is going to change lanes, different alerts may be provided to the driver according to different levels of danger. The display 303 may be implemented with a commonly-used navigation system.

The display 303 may be internally disposed within a housing integrally formed with the dashboard 310 wherein the display 303 may be exposed. Alternatively, the display 303 may be disposed in the middle or the lower portion of the center fascia 311, or may be disposed on the internal of the windshield or on the top portion of the dashboard 310 by a separate supporter. The display 303 may be disposed at any position to be considered by the designer.

Behind the dashboard 310, various devices including a processor, a communication module, a Global Positioning System (GPS) module, a storage, etc., may be disposed. The processor disposed in the vehicle 1 may be configured to control various electronic devices disposed in the vehicle 1, and may be configured as the controller 100. The aforementioned devices may be implemented using various members including semiconductor chips, switches, integrated circuits, resistors, volatile or nonvolatile memories, printed circuit boards (PCBs), and/or the like.

The center fascia 311 may be disposed in the middle of the dashboard 310, and may have input device 318*a* to 318*c* configured for inputting various instructions related to the vehicle 1. The input device 318*a* to 318*c* may be implemented with mechanical buttons, knobs, a touch pad, a touch screen, a joystick, a trackball, or the like. The driver may control a plurality of operations of the vehicle 1 by manipulating the input device 318*a* to 318*c*.

The gear box 315 is positioned below the center fascia 311 between the driver seat 301 and the passenger seat 302. In the gear box 315, a transmission 316, a container box 317, various input device 318d to 318e, etc., included. The input device 318d to 318e may be implemented with mechanical buttons, knobs, a touch pad, a touch screen, a joystick, a trackball, or the like. The container box 317 and input device 318d to 318e may be omitted in various exemplary embodiments.

The steering wheel 320 and an instrument panel 330 are positioned on the dashboard 310 in front of the driver seat 301.

The steering wheel 320 may rotate in a certain direction by manipulation of the driver, and accordingly, the front or rear wheels of the vehicle 1 are rotated, steering the vehicle 1. The steering wheel 320 includes a spoke 321 connected to a rotation shaft and a wheel 322 for gripping combined with the spoke 321. On the spoke 321, there may be input device configured for inputting various instructions, and the input device may be implemented with mechanical buttons, knobs, a touch pad, a touch screen, a joystick, a trackball, or the like. The wheel 322 may have a radial form to be conveniently manipulated by the driver, but is not limited thereto. Inside of at least one of the spoke 321 and the wheel for gripping 322, a vibrator 121 (in FIG. 4) may be disposed allowing at least one of the spoke 321 and the wheel 322 to vibrate at a predetermined intensity according to an external control signal. In some exemplary embodiments, the vibrator 121 may vibrate at various intensities according to the external control signals, and accordingly, at least one of the spoke 321 and the wheel 322 may vibrate accordingly. With the function of the vibrator 121, the vehicle 1 may provide haptic alerts to the driver. For example, at least one of the spoke 321 and the wheel 322 may vibrate, to an extent, corresponding to the level of danger determined when the vehicle 1 changes lanes. In the present case, various alerts may be provided to the driver. The higher the level of danger is, the stronger the at least one of the spoke 321 and the wheel 322 vibrate to provide a high level of alert to the driver.

Furthermore, a turn signal indicator input device 318f may be positioned in the rear of the wheel 320. The user may input a signal to change a driving direction or lanes through the turn signal indicator input device 318f while driving the vehicle 1.

The instrument panel 330 provides the driver with various information relating to the vehicle 1 including a speed of the vehicle 1, engine RPM, remaining fuel, temperature of an engine oil, turn signal indicators, a distance traveled by the vehicle, etc. The instrument panel 330 may be implemented with lights, indicators, or the like, and in various exemplary embodiments may be implemented with a display panel. In the present case, wherein the instrument panel 330 is implemented with the display panel in addition to the aforementioned information, the instrument panel 330 may provide other information to the driver including a gas mileage, whether a plurality of functions of the vehicle 1 are performed, or the like to the driver by displaying the information. The instrument panel 330 may output and provide a plurality alerts to the user based on different levels of danger to the vehicle 1. When the vehicle 1 changes lanes, the instrument panel 330 may provide different alerts to the driver based on the determined levels of danger.

Referring to FIG. 4, the vehicle 1 in an exemplary embodiment of the present invention may include a speed controller 70 configured for controlling the driving speed of the vehicle 1 operated by the driver, a speed detector 80 configured for detecting the driving speed of the vehicle 1, a storage 90 configured for storing data related to a control of the vehicle 1, a controller 100 configured for controlling the respective components of the vehicle 1 and the driving speed of the vehicle 1, a communication device 110 configured for transmitting and/or receiving data related to the control of the vehicle 1, and a warning device 120 configured for outputting a warning signal related to the operation of the vehicle 1 to the driver.

The speed controller 70 may control the speed of the vehicle 1 driven by the driver. The speed controller 70 may include an accelerator driver 71 and a brake driver 72.

The accelerator driver 71 may increase the speed of the vehicle 1 by activating the throttle upon reception of a control signal from the controller 100, and the brake driver 72 may decrease the speed of the vehicle by activating the brakes upon reception of a control signal from the controller 100.

The controller 100 may increase or decrease the driving speed of the vehicle 1 to increase or decrease the distance between the vehicle to an object based on the distance between the vehicle 1 and the object and a predetermined reference distance stored in the storage 90.

Furthermore, the controller 100 may determine an estimated Time To Collision (TTC) of the vehicle 1 against the object based on a relative distance and a relative speed between the vehicle 1 and the object, and may send a signal to control the driving speed of the vehicle 1 to the speed controller 70 based on the determined TTC.

The speed controller 70 may control the driving speed of the vehicle 1 under the control of the controller 100, and may decrease the driving speed of the vehicle 1 when the risk of collision between the vehicle 1 and the object is high.

As will be described below, when the controller 100 sends a braking signal to control driving of the vehicle 1, the speed controller 70 may apply the brakes of the vehicle 1 being driven. In other words, the controller 100 may send a signal to make a large or small change on the amount of braking applied to vehicle 1 based on data stored in the storage 90.

The speed controller 80 may detect the driving speed of the vehicle 1 driven by the driver under the control of the controller 100. The speed controller 80 may detect the driving speed using the rotation speed of the wheels 12 and/or 13 of the vehicle 1, and a device of the driving speed may be represented in kph, meaning a distance (km) traveled per unit time (h).

The storage 90 may store a plurality of data related to the control of the vehicle 1. In an exemplary embodiment of the present invention, the storage 90 may store information related to the driving speed, traveled distance, and time traveled of the vehicle 1, and further store information related to a type and position of an object detected by the capturer 350.

Furthermore, the storage 90 may store information related to a position and speed of an object detected by the detector 200, coordinate information related to a moving object, which varies in real time, and information related to a relative distance and relative speed between the vehicle 1 and the object.

In addition, the storage 90 may store data related to a plurality of mathematical formulas and control algorithms utilized in controlling the vehicle 1 In an exemplary embodiment of the present invention, and the controller 1 may send control signals to control the vehicle 1 according to the formulas and control algorithms stored in the storage 90.

The storage 90 may store information related to the surrounding conditions of a road detected by the detector 200 In accordance with various exemplary embodiments of the present invention. For example, the storage 90 may store information detected by the detector 200 relating to the positions and shapes of structures or obstacles surrounding the road on which the vehicle 1 is being driven.

The storage 90 may also store information received from a server or vehicle Ubiquitous System (CUbiS) center connected to a network through the communication device 110. The information received through the communication device 110 may include information related to the surrounding conditions of the road on which the vehicle 1 is being driven.

The storage 90 may be implemented with at least one of a non-volatile memory device including cache, read only memory (ROM), programmable ROM (PROM), erasable programmable ROM (EPROM), electrically erasable programmable ROM (EEPROM), a volatile memory device including random access memory (RAM), or a storage medium including hard disk drive (HDD) or compact disk (CD) ROM, without being limited thereto. The storage 90 may be a memory implemented with a chip separate from the aforementioned processor in relation to the controller 100, or may be implemented integrally with the processor in a single chip.

Referring to FIG. 1 and FIG. 4, at least one controller 100 may be internally disposed within the vehicle 1. The controller 100 may perform electronic control of the respective components associated with operation of the vehicle 1.

Figure 5:
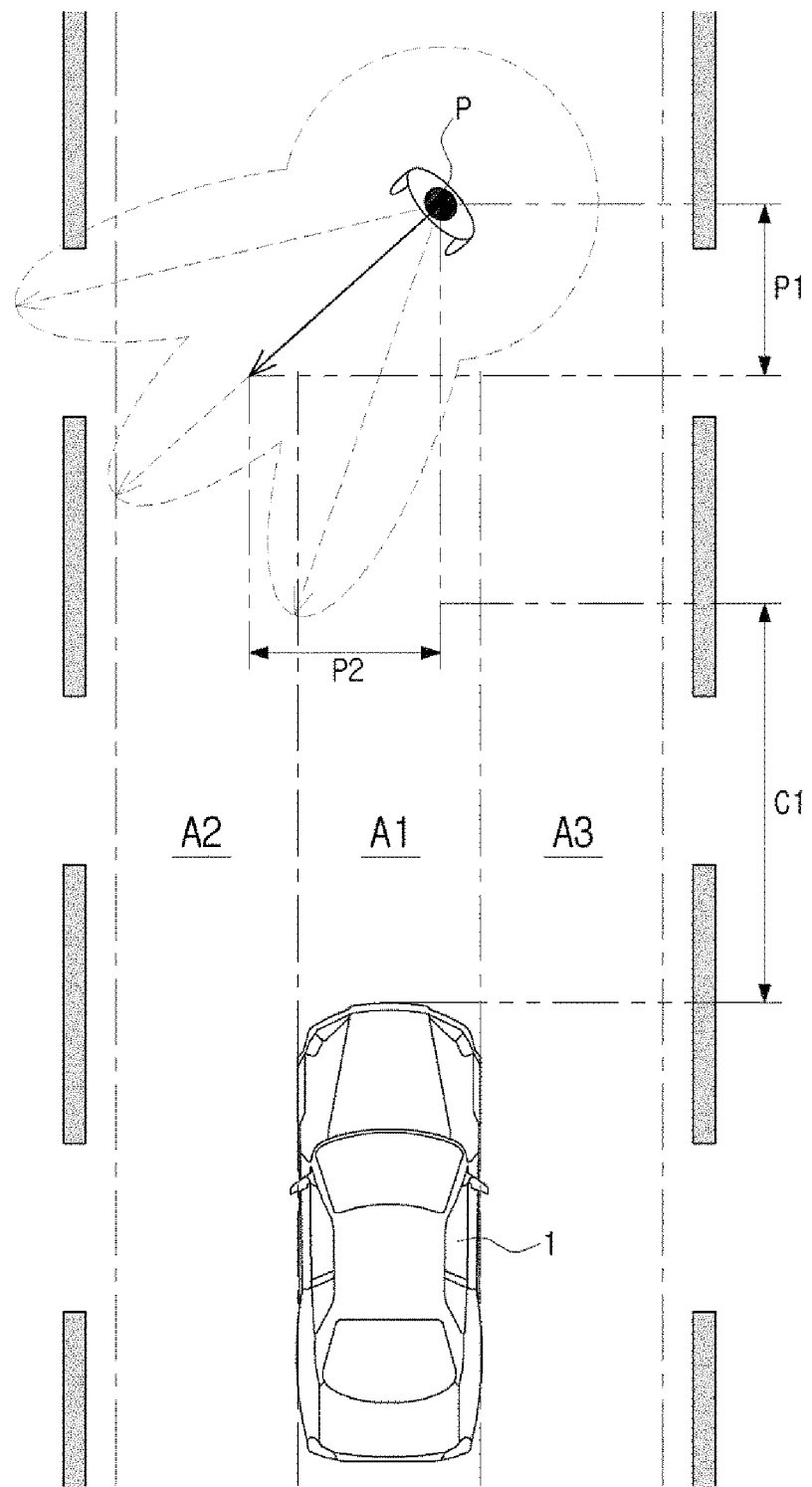
FIG. 5 shows how to determine a collision avoidance control area of a vehicle against an object according to an exemplary embodiment of the present invention.

FIG. 5 illustrates how to determine a collision avoidance control area of a vehicle against an object, according to an exemplary embodiment of the present invention.

Referring to FIG. 5, the controller 100 may determine a collision avoidance control area to avoid a collision of the vehicle 1 with an object on the road on which the vehicle 1 is being driven. When the object is a pedestrian P, it is often hard to correctly estimate a moving direction and a speed of the pedestrian P. A scenario when the object is the pedestrian P will now be taken as an exemplary embodiment for convenience of explanation; However, the present invention is not limited thereto. As shown in FIG. 5, the pedestrian P may walk in front of the vehicle 1 which is being driven, and the detector 200 disposed in the vehicle 1 may obtain at least one of a position information and a speed information related to the walking pedestrian P and send the information to the controller 100.

The pedestrian P may move in any direction on the road on which the vehicle 1 is being driven, and the moving speed of the pedestrian P may differ when the pedestrian P is walking or running. The vehicle 1 may capture and detect the pedestrian P with the capturer 350 while being driven, and simultaneously the detector 200 may obtain at least one of the position information and the speed information related to the pedestrian P and send the information to the controller 100.

The controller 100 may determine the collision avoidance control area to avoid a collision of the vehicle 1 with the pedestrian P based on at least one of the moving direction, lateral moving speed, and longitudinal moving speed of the pedestrian P.

The controller 100 may estimate a longitudinal moving distance P1 and a lateral moving distance P2 that the pedestrian P may travel for a certain time period, based on the longitudinal moving speed and the lateral moving speed of the pedestrian P, respectively.

The controller 100 may further estimate a longitudinal moving distance C1 that the vehicle 1 may travel for a certain time period at the driving speed, and may determine a Time To Collision (TTC) between the vehicle 1 and the pedestrian P based on the moving speeds and directions of the vehicle 1 and the pedestrian P, and a distance between the vehicle 1 and the pedestrian P.

In determining the collision avoidance control area for the vehicle 1 and the pedestrian P, the controller 100 may reflect the longitudinal moving distance C1 that the vehicle 1 may travel for a certain time period at the driving speed of the vehicle 1. Furthermore, the controller 100 may determine the longitudinal length of the collision avoidance control area by reflecting the longitudinal moving distance P1 that the pedestrian P may travel for a certain time period at the moving speed of the pedestrian P.

The controller 100 may determine the lateral length of the collision avoidance control area by reflecting the lateral moving distance P2 that the pedestrian P may travel for a certain time period at the moving speed of the pedestrian P.

Referring to FIG. 5, the collision avoidance control area may be divided into first to third areas A1, A2, and A3. The first area A1 is an area based on a width of the vehicle 1 which has a highest risk of collision between the vehicle 1 and the pedestrian P. The second and third areas A2 and A3 are areas not within the width of the vehicle 1, which are likely to have a risk of collision or expected to have a collision based on the moving direction and moving speed of the pedestrian P as well as the driving direction and driving speed of the vehicle 1.

Even when the vehicle 1 and the pedestrian P would not potentially collide with each other in the first area A1 having the same width as the vehicle 1, there is the risk of collision in the second and third areas A2 and A3, wherein the controller 100 determines all the first to third areas A1 to A3 as the collision avoidance control area to control avoidance of the collision between the vehicle 1 and the pedestrian P.

As will be described later, a size of the second or third area A2 or A3 may be changed according to the information related to the surrounding conditions of the road on which the vehicle 1 is being driven. For example, when there is a low risk of collision between the vehicle 1 and the pedestrian P in the second area A2 based on the surrounding condition of the road on which the vehicle 1 is being driven, the second area A2 may be reduced, or otherwise, when there is a higher risk of collision between the vehicle 1 and the pedestrian P in the second area A2, the second area A2 may be expanded.

Likewise, when there is a low risk of collision between the vehicle 1 and the pedestrian P in the third area A3 based on the surrounding condition of the road on which the vehicle 1 is being driven, the third area A3 may be reduced, or otherwise, when there is a higher risk of collision between the vehicle 1 and the pedestrian P in the third area A3, the third area A3 may be expanded.

Figure 6:
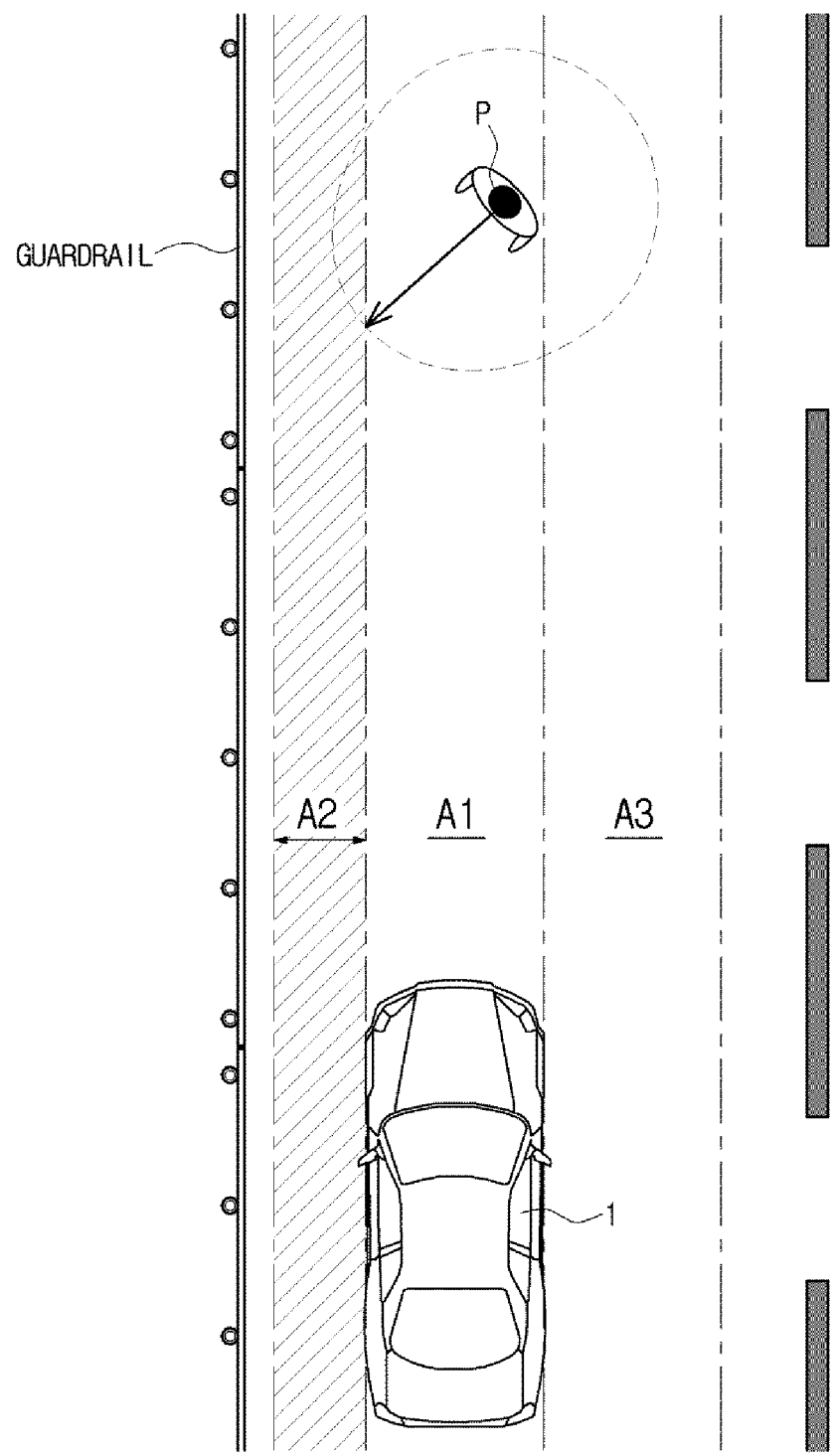
FIG. 6 shows how to reduce a collision avoidance control area of a vehicle against an object according to an exemplary embodiment of the present invention.
Figure 7:
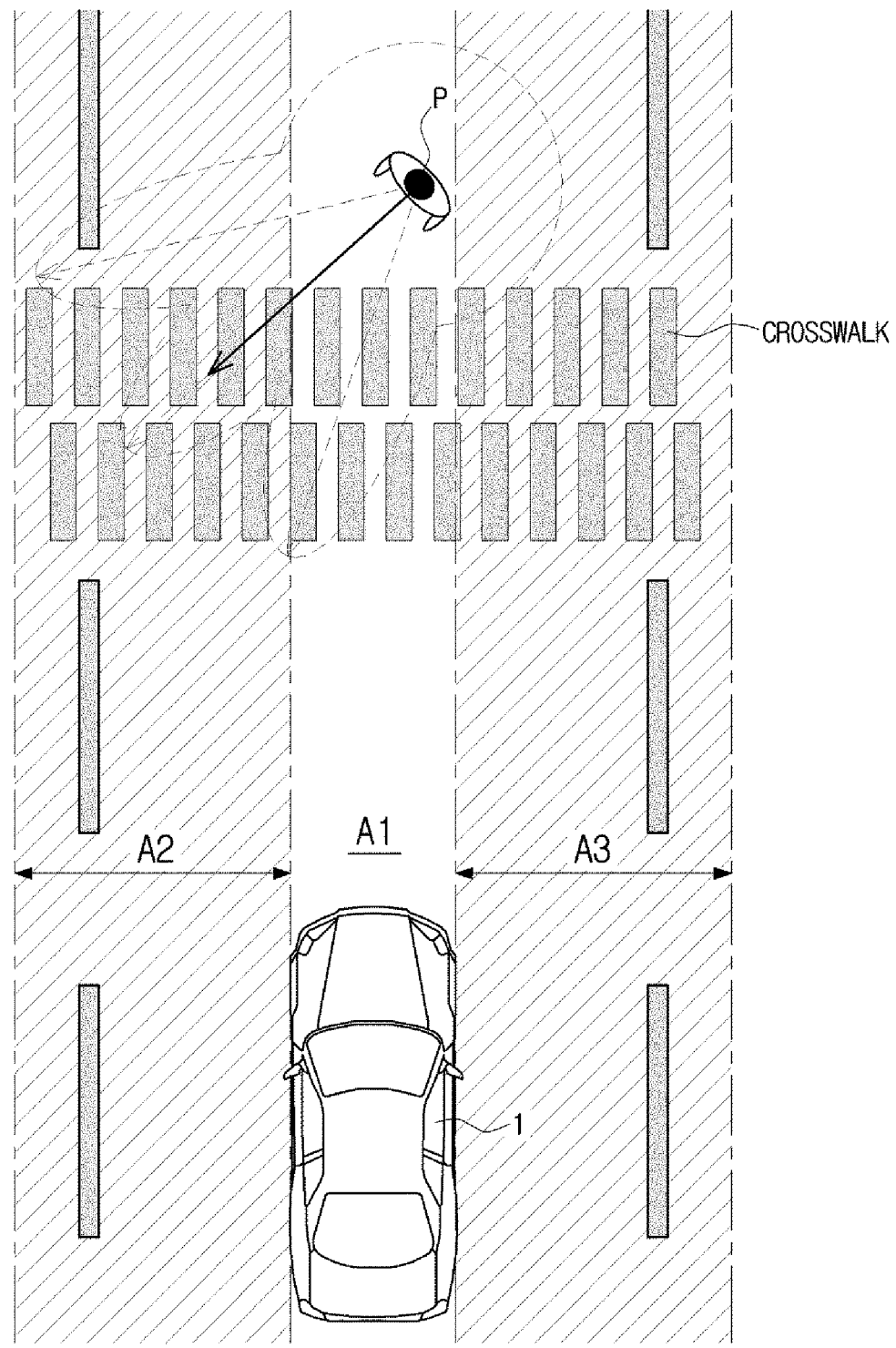
FIG. 7 and FIG. 8 show how to expand a collision avoidance control area of a vehicle against an object according to an exemplary embodiment of the present invention.
Figure 8:
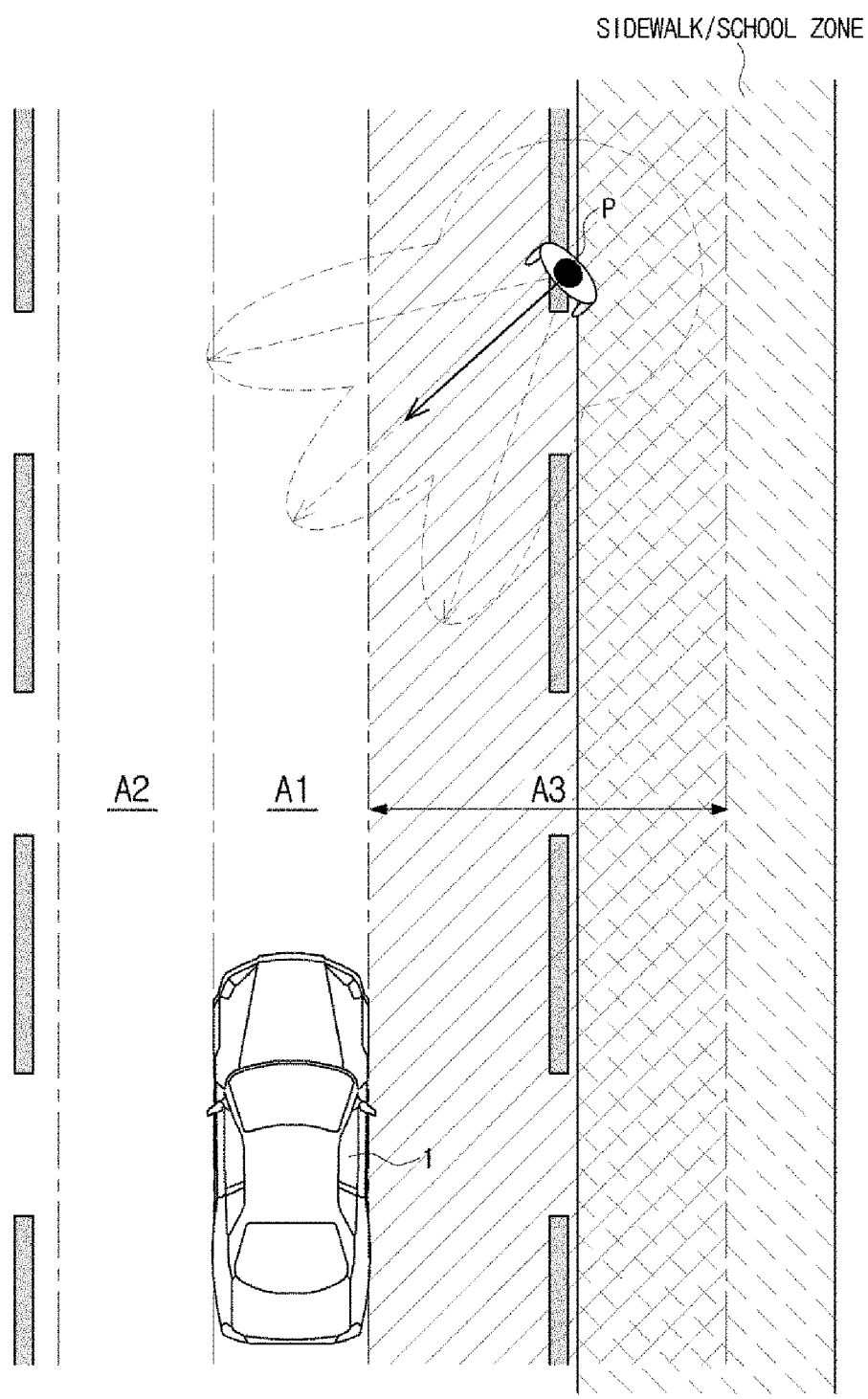

FIG. 6 illustrates how to reduce a collision avoidance control area of a vehicle against an object, according to an exemplary embodiment of the present invention, and FIG. 7 and FIG. 8 illustrate how to expand the collision avoidance control area of the vehicle against the object, according to an exemplary embodiment of the present invention.

Referring to FIG. 6, the detector 200 may obtain information related to the surrounding conditions of the road on which the vehicle 1 is being driven. For example, the detector 200 may detect the positions and shapes of various structures or obstacles surrounding the road on which the vehicle 1 is being driven.

For example, the detector 200 may detect a guardrail located on the road while the vehicle 1 is being driven, as shown in FIG. 6, and determine a shape and position of the guardrail based on data stored in the storage 90.

The detector 200 may obtain information related to the surrounding conditions of the road on which the vehicle 1 is being driven and send the information to the controller 100.

The communication device 110 may receive the information related to the surrounding conditions of the road on which the vehicle 1 is being driven, from a server or a CUbiS center 400 connected to a network. The CUbiS center 400 may include information regarding the road on which the vehicle 1 is being driven, and, include information related to structures or obstacles located on the road or environmental information on the area in which the road is located.

The CUbiS center 400 may create information in real time about the road on which the vehicle 1 is being driven, and send the information to the controller 100 through the communication device 110 based on predetermined road information.

In a case that a GPS receiver of the vehicle 1 sends information related to the surrounding conditions of the road received from GPS satellites to the CUbiS center 400 through the communication device 110, the CUbiS center 400 may provide information related to the surrounding condition of the road on which the vehicle 1 is currently running.

The communication device 110 may include at least one of a Bluetooth communication module that communicates one-to-one or one-to-many with the CUbiS center 200, a Wireless Fidelity (Wi-Fi) communication module that accesses a Local Area Network (LAN) through a wireless Access Point (AP), and a short-range communication module including a Zigbee communication module that forms a short-range communication network with the CUbiS center 400. However, the communication module included in the communication device 110 is not limited to the Bluetooth communication module, the Wi-Fi communication module, and the short-range communication module, but may include any other communication module configured for performing communication according to various communication protocols.

The controller 100 may change the collision avoidance control area for the vehicle 1 and the pedestrian P based on information related to the surrounding conditions of the road detected by the detector 200, or the information related to the surrounding conditions of a road received from the CUbiS center 400 through the communication d 110.

The controller 100 may determine a current condition the road on which the vehicle 1 is being driven based on the information related to the surrounding conditions of the road. The condition determined by the controller 100 corresponds to a reference for the controller 100 to change the collision avoidance control area to avoid a collision between the vehicle 1 and the pedestrian P.

The controller 100 may determine whether there is a structure, including a guardrail, on the road on which the vehicle 1 is being driven, based on data obtained by the detector 200 or the communication device 110, and/or data stored in the storage 90.

When it is determined that there is such a structure as the guardrail, the information related to the surrounding conditions of the road on which the vehicle 1 is being driven may be determined as a first condition. The first condition corresponds to a condition under which an area on the road on which the vehicle 1 is being driven, into which the pedestrian P may move, is less than a predetermined threshold. , to clarify a difference between FIG. 5 and FIG. 6, FIG. 5 shows an ordinary road and the pedestrian P may move into the second area A2 of the collision avoidance control area, while FIG. 6 shows a road with the guardrail disposed thereon and the pedestrian P is not likely to move into the second area A2, which makes an area into which the pedestrian P may move less than the predetermined threshold.

In other words, unlike the road shown in FIG. 5, the road with the guardrail disposed thereon, as shown in FIG. 6, has a lower risk of collision between the vehicle 1 and the pedestrian P in the second area A2, wherein the controller 100 may determine the information related to the surrounding conditions of the road on which the vehicle 1 is being driven to be the first condition.

In the present case where the information related to the surrounding conditions of the road is determined to be the first condition, the controller 100 may reduce an amount of collision avoidance control of the vehicle 1 against the pedestrian P in the second area A2, and thus reduce the second area A2 of the collision avoidance control area.

A degree to which the controller 100 reduces the collision avoidance control area may be determined based on a predetermined value.

Although the guardrail is positioned on a side of the second area A2 of the collision avoidance control area in FIG. 6, the aforementioned control method may be equally applied to an occasion when the guardrail is positioned on a side of the third area A3 of the collision avoidance control area.

Furthermore, similar to the method of reducing the collision avoidance control area when there is the guardrail disposed on the road on which the vehicle 1 is being driven, the controller 100 may reduce the collision avoidance control area even when the road, on which the vehicle 1 is being driven, is a highway or freeway.

In the case that the road, on which the vehicle 1 is being driven, is a highway or freeway, a pedestrian P standing or walking on the highway or freeway is highly unlikely, wherein the controller 100 may reduce the collision avoidance control area for the vehicle 1 and the pedestrian P.

Whether the road, on which the vehicle 1 is being driven, is a highway or freeway may be determined by the controller 100 based on data obtained by the detector 200 or data received through the communication device 110.

Referring to FIG. 7, the detector 200 may detect a crosswalk located on the road on which the vehicle 1 is being driven, and determine the shape and position of the crosswalk based on data stored in the storage 90. The detector 200 may send the obtained surrounding condition information to the controller 100. The capturer 350 may also identify the crosswalk through image capturing and send the identified information to the controller 100.

The communication device 110 may receive information related to a crosswalk located on the road on which the vehicle 1 is being driven from the server or the CUbiS center 400 connected to the network.

The controller 100 may change the collision avoidance control area for the vehicle 1 and the pedestrian P based on information related to the crosswalk on the road detected by the detector 200, or the information related to crosswalks on the road received from the CUbiS center 400 through the communication device 110.

The controller 100 may determine whether there is a crosswalk on the road on which the vehicle 1 is being driven and determine the shape and location of the crosswalk based on data obtained by the detector 200 or by the communication device 110 and data stored in the storage 90.

When it is determined that there is a crosswalk, the information related to the surrounding conditions of the road on which the vehicle 1 is being driven may be determined as a second condition. The second condition corresponds to a condition under which the area on the road on which the vehicle 2 is being driven, into which the pedestrian P may move, is greater than the predetermined threshold.

When compared with FIG. 7, FIG. 5 shows an ordinary road and the controller 100 determines the first to third areas A1 to A3 within a lane on which the vehicle 1 is being driven to determine the collision avoidance control area.

In a case of FIG. 7, however, there is a crosswalk on the road and the pedestrian P may move across the crosswalk away from the lane on which the vehicle 1 is being driven, wherein the controller 100 may need to expand the collision avoidance control area to include the entire area of the crosswalk.

In the case that there is a crosswalk on the road on which the vehicle 1 is being driven, as shown in FIG. 7, apart from the fact that the vehicle 1 may recognize the crosswalk and stop to avoid a collision with the pedestrian P, the area into which the pedestrian may move along the crosswalk increases, and thus the area having a higher risk of collision between the vehicle 1 and the pedestrian increases.

Accordingly, unlike the road shown in FIG. 5, the road with a crosswalk as shown in FIG. 7 has a higher risk of collision between the vehicle 1 and the pedestrian P in the second and third areas A2 and A3, wherein the controller 100 may determine the information related to the surrounding conditions of the road on which the vehicle 1 is being driven to be the second condition.

In the present case where the information related to the surrounding conditions of the road is determined to be the second condition, the controller 100 needs to increase the amount of collision avoidance control of the vehicle 1 against the pedestrian P in at least one of the second and third areas A2 and A3, and may thus expand at least one of the second and third areas A2 and A3 of the collision avoidance control area. The degree to which the controller 100 expands the collision avoidance control area may be determined based on a predetermined value.

Although an exemplary embodiment of expanding both the second and third areas A2 and A3 of the collision avoidance control area due to the crosswalk on the road on which the vehicle 1 is being driven is shown in FIG. 7, only one of the second and third areas A2 and A3 may be expanded depending on the shape and location of the crosswalk.

Referring to FIG. 8, the detector 200 may detect at least one of the sidewalk and the school zone located around the road, on which the vehicle 1 is being driven, and determine the shape and location of the at least one of the sidewalk and the school zone based on data stored in the storage 90. The detector 200 may send the obtained surrounding condition information to the controller 100. The capturer 350 may also identify at least one of the sidewalk and the school zone through image capturing and send the identified information to the controller 100.

The communication device 110 may receive information related to at least one of the sidewalk and the school zone located around the road on which the vehicle 1 is being driven from the server or the CUbiS center 400 connected to a network.

The controller 100 may change the collision avoidance control area for the vehicle 1 and the pedestrian P based on information related to the at least one of the sidewalk and the school zone around the road detected by the detector 200, or the information related to the at least one of the sidewalk and the school zone around the road received from the CUbiS center 400 through the communication device 110.

The controller 100 may determine whether there is at least one of a sidewalk and the school zone around the road on which the vehicle 1 is being driven and determine the shape and location of the at least one of the sidewalk and the school zone, based on data obtained by the detector 200 or by the communication device 110, and data stored in the storage 90.

When it is determined that there is at least one of the sidewalk and the school zone, the information related to the surrounding conditions of the road on which the vehicle 1 is being driven may be determined as the second condition.

When compared with FIG. 8, FIG. 5 shows an ordinary road and the controller 100 determines the first to third areas A1 to A3 within a lane on which the vehicle 1 is being driven to determine the collision avoidance control area.

In a case of FIG. 8, however, since there is at least one of a sidewalk and a school zone existing around the road, the pedestrian P walking on the sidewalk may be more likely to move into the road on which the vehicle 1 is being driven. It is common to have facilities, including preschools or elementary schools, around the school zone and children walking in the school zone are more likely to suddenly dash into the road on which the vehicle 1 is being driven. In the present case, the controller 100 needs to expand the collision avoidance control area for the vehicle 1 and the pedestrian P.

In the case that there is at least one of the sidewalk and the school zone existing on the road on which the vehicle 1 is being driven, as shown in FIG. 8, apart from the fact that the vehicle 1 may recognize the pedestrian P running into the road from at least one of the sidewalk and the school zone and stop running to avoid a collision with the pedestrian P, the area into which the pedestrian P may move to the road from at least one of the sidewalk and the school zone increases, and thus the area having a higher risk of collision between the vehicle 1 and the pedestrian P increases.

Accordingly, unlike the road shown in FIG. 5, the road with at least one of the sidewalk and the school zone located thereabout, as shown in FIG. 8, has a higher risk of collision between the vehicle 1 and the pedestrian P in the third area A3, wherein the controller 100 may determine the information related to the surrounding conditions of the road on which the vehicle 1 is being driven to be the second condition.

In the present case where the information related to the surrounding conditions of the road is determined to be the second condition, the controller 100 needs to increase the degree of collision avoidance control of the vehicle 1 against the pedestrian P in the third area A3, as shown in FIG. 8, and may thus expand the third area A3 of the collision avoidance control area. The degree to which the controller 100 expands the collision avoidance control area may be determined based on a predetermined value.

Although an exemplary embodiment of expanding the third area A3 of the collision avoidance control area due to at least one of the sidewalk and the school zone located on the right hand side of the road on which the vehicle 1 is being driven is shown in FIG. 8, the first or second area A1 or A2, instead of the third area A3, may be expanded depending on the shape and position of the at least one of the sidewalk and the school zone.

FIG. 9 and FIG. 10 are conceptual diagrams illustrating a change of when to send a signal to warn of a collision between the vehicle and an object, and a degree of braking applied to the vehicle based on a changed collision avoidance control area, according to an exemplary embodiment of the present invention.

Referring to FIG. 9, the controller 100 may change at least one of the time to send the signal to warn of the collision between the vehicle 1 and the pedestrian P and the amount of braking applied the vehicle 1, based on the collision avoidance control area changed in the way described above, with reference to FIG. 6, FIG. 7, and FIG. 8.

The controller 100 may reduce the collision avoidance control area for the vehicle 1 and the pedestrian P when the surrounding condition information related to the road on which the vehicle 1 is being driven corresponds to the first condition as shown in FIG. 6.

When the collision avoidance control area is reduced, the controller 100 may change the time to send the signal to warn of the collision between the vehicle 1 and the pedestrian P to be later than a predetermined point in time. The time to send the signal to warn of the collision may be determined in advance and stored in the storage 90.

For example, when the surrounding condition information related to the road on which the vehicle 1 is being driven corresponds to the first condition, it device a condition wherein an area into which the pedestrian P may move on the road is less than a predetermined threshold and the risk of collision between the vehicle 1 and the pedestrian P is lower than a normal situation. In the case wherein a guardrail is disposed on the road on which the vehicle 1 is being driven, as shown in FIG. 6, the pedestrian P is not likely to move into the second area A2 where the guardrail is disposed, so an area into which the pedestrian P may move is smaller than the predetermined threshold.

Figure 9A:
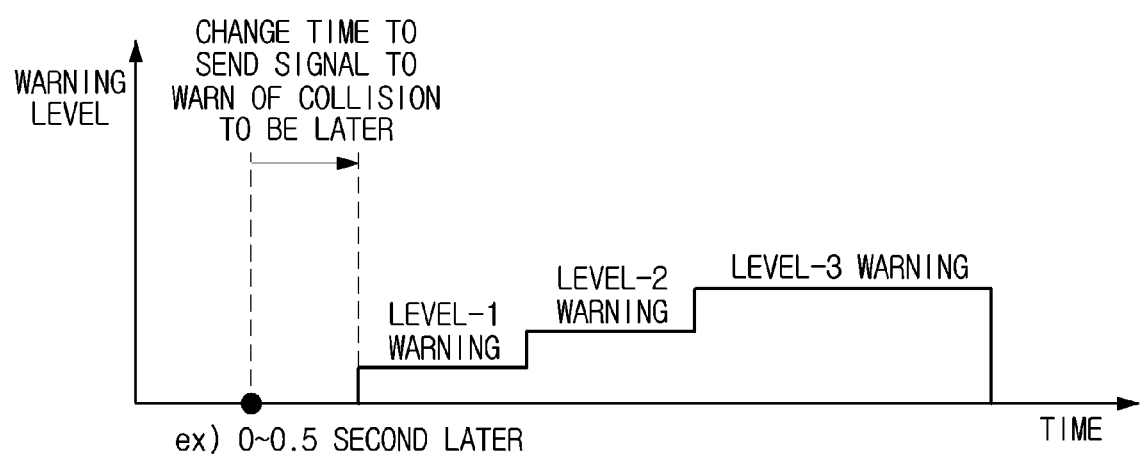
FIG. 9A, FIG. 9B, FIG. 10A, and FIG. 10B are conceptual diagrams illustrating a changing of a time to send a signal to warn of a collision between a vehicle and an object and an amount of braking applied to the vehicle based on a changed collision avoidance control area according to an exemplary embodiment of the present invention.

Accordingly, when the collision avoidance control area is reduced for the vehicle 1 and the pedestrian P, the controller 100 may change the time to send the collision warning signal to be later than a predetermined point in time. For example, as shown in FIG. 9A, the controller 100 may send the collision warning signal approximately 0.5 second later than the predetermined point in time. The degree of delay of the signal to be sent compared to the predetermined point in time may depend on the control settings.

The controller 100 may control the warning device 120 to send the signal to warn of the collision between the vehicle 1 and the pedestrian P to the driver. The warning device 120 may provide the driver with a warning of a level corresponding to a risk level of collision between the vehicle 1 and the pedestrian P based on the signal sent from the controller 100.

The controller 100 may determine the risk level of collision based on the TTC between the vehicle 1 and the pedestrian P, and the warning device 120 may provide a level-1 warning, a level-2 warning, or a level-3 warning to the driver based on the risk level of collision determined by the controller 100. When the risk level of collision is relatively higher than in the level-1 warning situation, the level-2 warning signal may be sent; when the risk level of collision is relatively higher than in the level-2 warning situation, the level-3 warning signal may be sent. The level-1 warning to level-3 warning may be provided sequentially for the driver over time.

The level-3 warning may be determined to be stronger than the level-2 warning for the driver to have more caution about a collision with the pedestrian P, and similarly, the level-2 warning may be determined to be stronger than the level-1 warning for the driver to have more caution about the collision with the pedestrian P.

The warning device 120 may include at least one of e.g., the vibrator 121, a display 122, and a sound output 123.

The vibrator 121 may vibrate according to the received control signal. The vibrator 121 may vibrate using a vibration motor or an electromagnet. A vibrating substance actuated by the vibrator 121 used may include e.g., the spoke 321 or wheel 322 of the steering wheel 320, in which case, the vibrator 121 may be internally disposed within the spoke 321 or wheel 322 to vibrate the spoke 321 or wheel 322. The vibrator 121 may vibrate with various intensities according to the control signal.

The display 122 may output a warning message on a screen according to the received control signal. The display 122 may be implemented by the display device 303 for the vehicle 1, or the instrument panel 330. The display 122 may output and provide different warning messages to the user according to the control signal. For example, the display 122 may output different warning messages indicating a plurality of content, e.g., very dangerous, dangerous, or safe, to correspond to different levels of danger. The display 122 may also output and provide the warning message to the user in a plurality of device according to the control signal. For example, the display 122 may output warning messages in different colors according to the different levels of danger. In addition, the display 122 may deliver the warning message by outputting a text in a size corresponding to the received level of danger, or may deliver the warning message by repeatedly flickering a light at a rate which corresponds to the received level of danger. The display 122 may output different warning messages according to different levels of danger in various means.

The sound output 123 may output the warning message or a warning sound in a voice according to the received control signal. The sound output 123 may use a human voice prerecorded to output the warning message. A type of the warning sound output from the sound output 123 may be determined or changed by the designer or the driver. The sound output 123 may be implemented by a speaker directly disposed in the vehicle 1 or a speaker disposed in the display device 303 for vehicle 1. The sound output 123 may output and provide different warning messages according to the control signal, or the warning message in different device according to the control signal.

When the collision avoidance control area is reduced for the vehicle 1 and the pedestrian P, the controller 100 may change the amount of braking applied to control the driving speed of the vehicle 1 to be less than a predetermined value. Data of the amount of braking applied for a provided driving speed of the vehicle 1 may be predetermined and stored in the storage 90.

For example, when the surrounding condition information related to the road on which the vehicle 1 is being driven corresponds to the first condition, it device a condition under which an area into which the pedestrian P may move on the road is smaller than a predetermined threshold and the risk of collision between the vehicle 1 and the pedestrian P is lower than the normal situation.

Figure 9B:
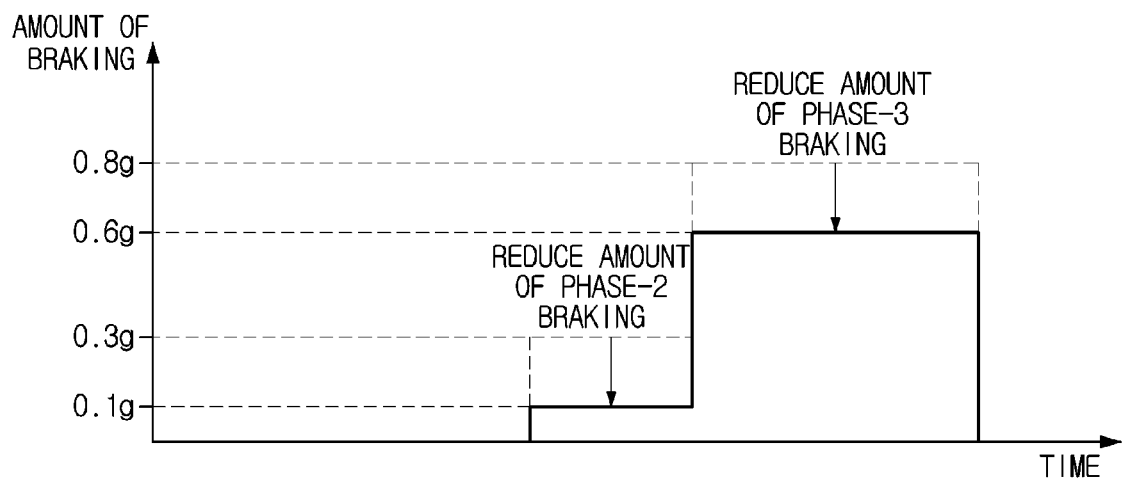

Accordingly, the controller 100 may change the amount of braking of the vehicle 1 to be less than the predetermined value, referring to FIG. 9B, assuming that an amount of phase-2 braking applied to the vehicle 1 is 0.3 grams (g) and an amount of phase-3 braking is 0.8 g under a normal driving condition, when the collision avoidance control area of the vehicle 1 against the pedestrian P is reduced, the amounts of phase-2 braking and phase-3 braking may be changed down into 0.1 g and 0.6 g, respectively.

For example, when the surrounding condition information related to the road on which the vehicle 1 is being driven corresponds to the first condition, the collision avoidance control area is reduced, meaning that the risk of collision between the vehicle 1 and the pedestrian P is low, the controller 100 may change the amount of braking applied to control the driving speed of the vehicle 1 to be less than a predetermined value.

The degree to which the controller 100 changes the amount of applied braking may depend on the control settings, and the speed controller 70 may control the driving speed of the vehicle 1 according to the signal sent from the controller 100.

Referring to FIG. 10, the controller 100 may expand the collision avoidance control area for the vehicle 1 and the pedestrian P when the surrounding condition information related to the road on which the vehicle 2 is being driven corresponds to the second condition as shown in FIG. 7 and FIG. 8.

When the collision avoidance control area is expanded, the controller 100 may change the time to send the signal to warn of the collision between the vehicle 1 and the pedestrian P to be earlier than a predetermined point in time. The time to send the signal to warn of the collision may be predetermined and stored in the storage 90.

For example, when the surrounding condition information related to the road on which the vehicle 1 is being driven corresponds to the second condition, it device a condition under which an area into which the pedestrian P may move on the road is greater than the predetermined threshold and the risk of collision between the vehicle 1 and the pedestrian P is higher than the normal situation.

As shown in FIG. 7 and FIG. 8, when there is the crosswalk on the road on which the vehicle 1 is being driven or when there is at least one of the sidewalk and the school zone around the road, an area into which the pedestrian P may move is greater than the predetermined threshold.

Figure 10A:
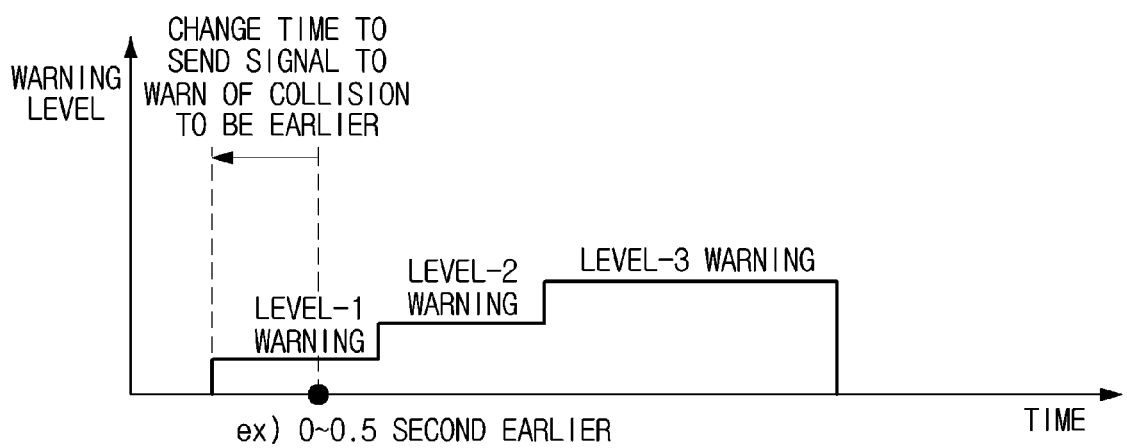

Accordingly, when the collision avoidance control area is expanded for the vehicle 1 and the pedestrian P, the controller 100 may change the time to send the collision warning signal to be earlier than a predetermined point in time. For example, as shown in FIG. 10A, the controller 100 may send the collision warning signal approximately 0.5 second earlier than the predetermined point in time. How much earlier the signal to is configured to be sent than the predetermined point in time may depend on the control settings.

The controller 100 may control the warning device 120 to send the signal to warn of the collision between the vehicle 1 and the pedestrian P to the driver. The warning device 120 may provide the driver with the warning of a level corresponding to a risk level of collision between the vehicle 1 and the pedestrian P based on the signal sent from the controller 100.

When the collision avoidance control area is expanded for the vehicle 1 and the pedestrian P, the controller 100 may change the amount of braking applied to control the driving speed of the vehicle 1 to be greater than the predetermined value. Data of the amount of applied braking for a provided driving speed of the vehicle 1 may be predetermined and stored in the storage 90.

For example, when the surrounding condition information related to the road on which the vehicle 1 is being driven corresponds to the second condition, it device a condition under which an area into which the pedestrian P may move on the road is greater than the predetermined threshold and the risk of collision between the vehicle 2 and the pedestrian P is higher than the normal situation.

Figure 10B:
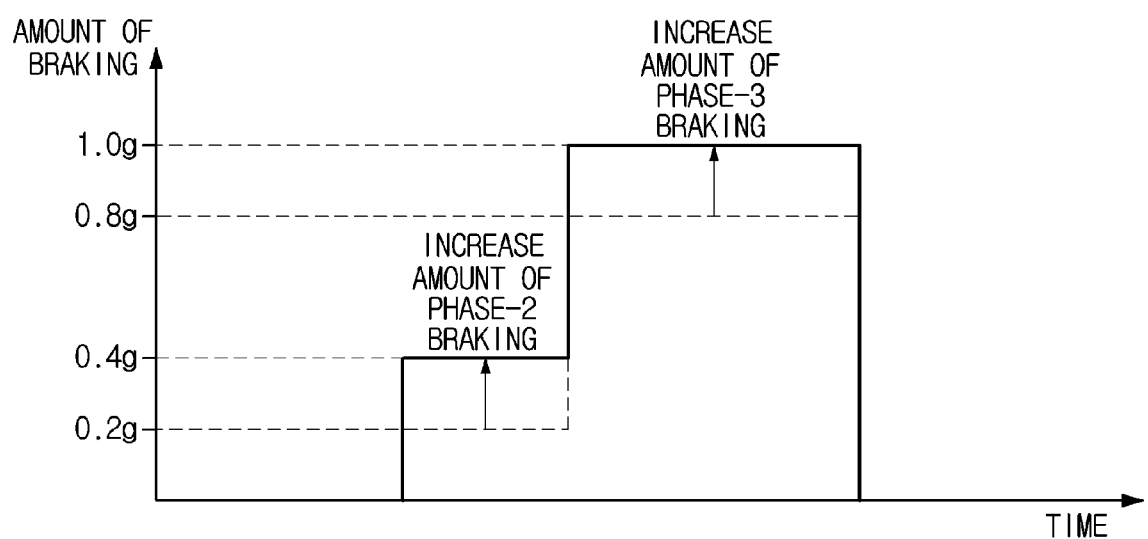

Accordingly, the controller 100 may change the amount of braking applied to the vehicle 1 to be greater than the predetermined value, as shown in FIG. 10B, referring to FIG. 10B, assuming that an amount of phase-2 braking of the vehicle 1 is 0.2 g and an amount of phase-3 braking is 0.8 g under a normal driving condition, when the collision avoidance control area of the vehicle 1 against the pedestrian P is expanded, the amounts of phase-2 braking and phase-3 braking may be changed up to 0.4 g and 1.0 g, respectively.

For example, when the surrounding condition information related to the road on which the vehicle 1 is being driven corresponds to the second condition, the collision avoidance control area is expanded, meaning that the risk of collision between the vehicle 2 and the pedestrian P is high, the controller 100 may change the amount of braking applied to control the driving speed of the vehicle 1 to be greater than the predetermined value.

How large the controller 10 to is configured to change the amount of applied braking may depend on the control settings, and the speed controller 70 may control the driving speed of the vehicle 1 according to the signal sent from the controller 100.

Figure 11:
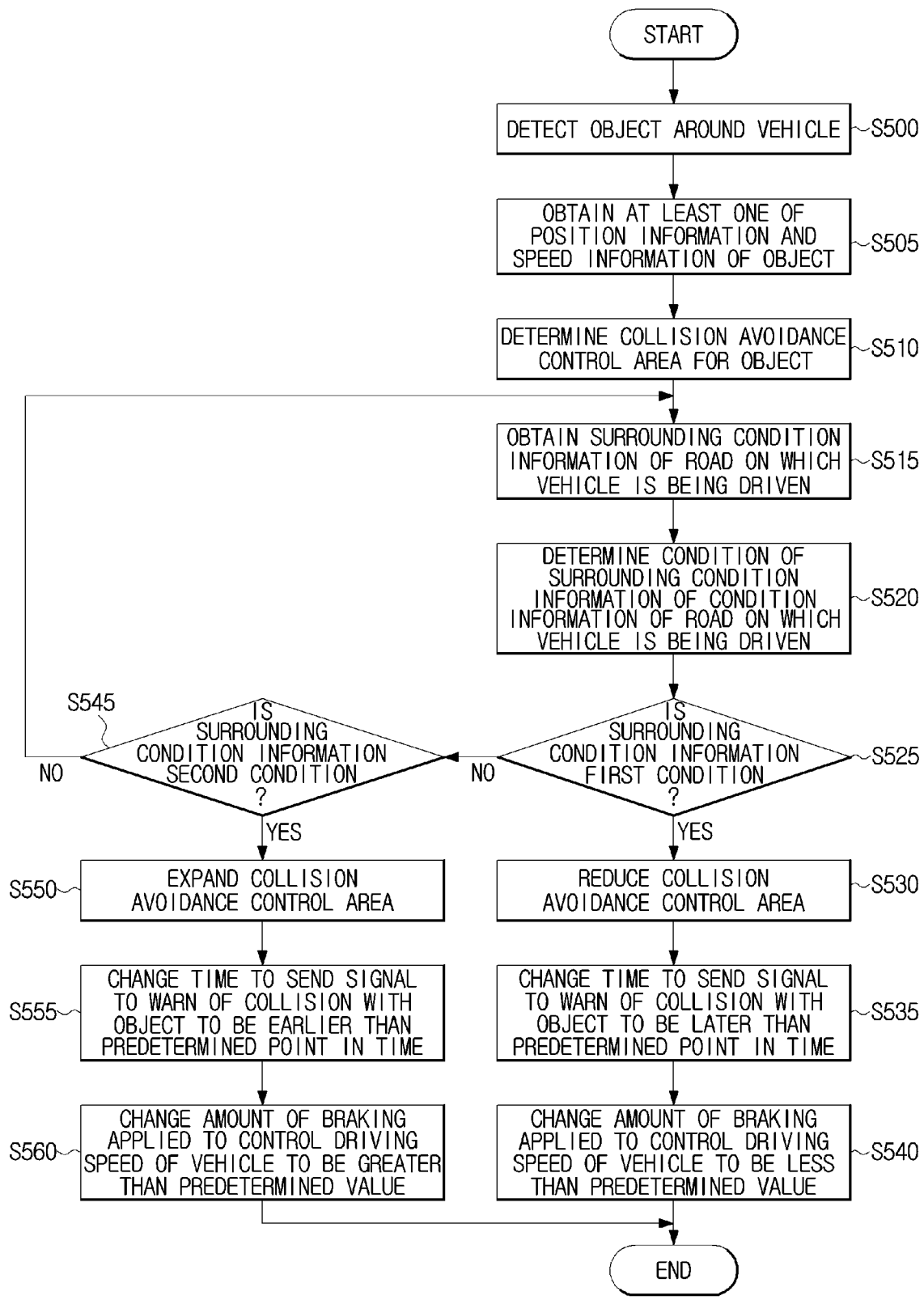
FIG. 11 is a flowchart illustrating a method for controlling a vehicle according to an exemplary embodiment of the present invention.

FIG. 11 is a flowchart illustrating a method for controlling a vehicle, according to an exemplary embodiment of the present invention.

Referring to FIG. 11, the capturer 350 may capture an image around the vehicle 1 while the vehicle 1 is being driven or stopped, detect an object around the vehicle 1 (S500), and further obtain information related to a type and location of the object.

The detector 200 may detect an object located in front of the vehicle 1 to obtain at least one of position information and moving speed information related to the detected object (S505).

The controller 100 may determine a collision avoidance control area to avoid a collision of the vehicle 1 with an object on the road on which the vehicle 1 is being driven (S510). In the present regard, the controller 100 may determine a collision avoidance control area to avoid a collision of the vehicle 1 with the object based on at least one of a moving direction, lateral moving speed, and longitudinal moving speed of the object.

The detector 200 may obtain information related to surrounding conditions of a road on which the vehicle 1 is being driven (S515). The surrounding condition information may include positions and shapes of various structures or obstacles located around the road on which the vehicle 1 is being driven, and other various information related to the surroundings of the road, including traffic conditions of the road, surface conditions of the road, etc. For example, the detector 200 may detect structures or obstacles located around the vehicle 1 while the vehicle 1 is being driven, and determine shapes and types of the detected structures or obstacles based on data stored in a storage 90.

The controller 100 may determine a condition of the information related to the surrounding conditions of the road on which the vehicle 1 is being driven (S520), when the vehicle 1 is under a condition where an area into which the object may move on the road on which the vehicle 1 is being driven is smaller than a predetermined threshold, the controller 100 may determine the surrounding condition information to be the first condition. For example, when there is a guardrail on the road on which the vehicle 1 is being driven, or when the road is a highway or freeway, the controller 100 may determine the surrounding condition information to be the first condition.

Furthermore, when the vehicle 1 is under a condition where an area into which the object may move on the road on which the vehicle 2 is being driven is greater than a predetermined threshold, the controller 100 may determine the surrounding condition information to be the second condition. For example, when there is a crosswalk on the road on which the vehicle 1 is being driven, or when there is at least one of the sidewalk and the school zone around the road, the controller 100 may determine the surrounding condition information to be the second condition.

The controller 100 may determine whether the surrounding condition information related to the road on which the vehicle 1 is being driven is the first condition (S525), and when it is determined that the surrounding condition information corresponds to the first condition, the controller 100 may reduce the collision avoidance control area (S530).

When the collision avoidance control area is reduced, the controller 100 may change the time to send a signal to warn of a collision with an object to be later than a predetermined point in time (S535), and change an amount of braking applied to control the driving speed of the vehicle 1 to be less than a predetermined value (S540).

When it is determined that the surrounding condition information related to the road on which the vehicle 1 is being driven is not the first condition, the controller 100 may determine whether the surrounding condition information related to the road is the second condition (S545), and when it is determined that the surrounding condition information corresponds to the second condition, the controller 100 may expand the collision avoidance control area (S550).

When the collision avoidance control area is expanded, the controller 100 may change the time to send a signal to warn of a collision with an object to be earlier than the predetermined point of time (S555), and change an amount of braking applied to control the driving speed of the vehicle 1 to be greater than a predetermined value (S560).

According to exemplary embodiments of the present invention, collision avoidance control against an object may be effectively performed by accounting for a surrounding condition of a road on which a vehicle is being driven to change a collision avoidance control area. Furthermore, collision avoidance control tailored for situations may be performed by controlling the time to send a collision warning signal and controlling the amount of braking applied to the vehicle based on the changed collision avoidance control area.

Meanwhile, the exemplary embodiments of the present invention may be implemented in a form of a recording media for storing instructions to be conducted by a computer. The instructions may be stored in a form of program codes, and when executed by a processor may generate program modules to perform operation in the exemplary embodiments of the present invention. The recording media may correspond to a computer-readable recording media.

The computer-readable recording medium includes any type of recording medium having data stored thereon that may be thereafter read by a computer. For example, the computer-readable recording medium may be a ROM, a RAM, a magnetic tape, a magnetic disk, a flash memory, an optical data storage device, etc.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
   a capturer configured to capture an object around the vehicle to detect the object;
   a detector configured to obtain at least one of a position information and a speed information related to the object; and
   a controller configured to determine a collision avoidance control area for the object based on the at least one of the position information and the speed information related to the object, change the determined collision avoidance control area based on information related to a surrounding condition of a road on which the vehicle is being driven, and change at least one of a time to send a signal to warn of a collision with the object and/or an amount of braking applied to the vehicle based on the changed collision avoidance control area,
   wherein the controller is configured to, based on the information related to the surrounding condition of the road on which the vehicle is being driven, reduce the determined collision avoidance control area when the information related to the surrounding condition of the road on which the vehicle is being driven corresponds to a first condition, and expand the determined collision avoidance control area when the information related to the surrounding condition of the road corresponds to a second condition.

2. The vehicle of claim 1, wherein the controller is configured to determine the collision avoidance control area based on at least one of a moving direction, a lateral moving speed, and a longitudinal moving speed of the object.

3. The vehicle of claim 1, wherein the controller is configured to determine the information related to the surrounding condition to be the first condition when an area on the road on which the vehicle is being driven, into which the object moves is smaller than a predetermined threshold.

4. The vehicle of claim 1, wherein the controller is configured to determine the information related to the surrounding condition to be the first condition when there is a guardrail on the road on which the vehicle is being driven or when the road is a highway or freeway.

5. The vehicle of claim 1, wherein the controller is configured to determine the information related to the surrounding condition to be the second condition when an area on the road on which the vehicle is being driven, into which the object moves is greater than a predetermined threshold.

6. The vehicle of claim 1, wherein the controller is configured to determine the information related to the surrounding condition to be the second condition when there is a crosswalk on the road on which the vehicle is being driven or when there is at least one of a sidewalk and a school zone adjacent to the road.

7. The vehicle of claim 1, wherein the controller is configured to change a time to send a signal to warn of a collision with the object to be later than a predetermined point in time when the collision avoidance control area is reduced, and change a time to send a signal to warn of a collision with the object to be earlier than the predetermined point in time when the collision avoidance control area is expanded.

8. The vehicle of claim 1, wherein the controller is configured to change an amount of braking applied to control driving speed of the vehicle to be less than a predetermined value when the collision avoidance control area is reduced, and change the amount of braking applied to control driving speed of the vehicle to be greater than the predetermined value when the collision avoidance control area is expanded.

9. The vehicle of claim 1, wherein the detector is configured to obtain information related to a surrounding condition of a road on which the vehicle is being driven.

10. The vehicle of claim 1, further including:
a communication device configured to receive information related to a surrounding condition of a road on which the vehicle is being driven from a Car Ubiquitous System (CUbiS) center.

11. The vehicle of claim 1, further including:
a storage configured to store information related to a surrounding condition of a road on which the vehicle is being driven.

12. A method for controlling a vehicle, the method including:
capturing an object around the vehicle to detect the object;
obtaining at least one of a position information and a speed information related to the object;
determining a collision avoidance control area for the object based on the at least one of the position information and the speed information related to the object;
changing the determined collision avoidance control area based on information related to a surrounding condition of a road on which the vehicle is being driven; and
changing at least one of a time to send a signal to warn of a collision with the object and/or an amount of braking applied to the vehicle based on the changed collision avoidance control area,
wherein the changing of the determined collision avoidance control area includes based on the information related to the surrounding condition of the road on which the vehicle is being driven, reducing the determined collision avoidance control area when the information related to the surrounding condition of the road on which the vehicle is being driven corresponds to a first condition, and expanding the determined collision avoidance control area when the information related to the surrounding condition of the road corresponds to a second condition.

13. The method of claim 12, wherein the determining of a collision avoidance control area for the object includes:
determining the collision avoidance control area based on at least one of a moving direction, a lateral moving speed, and a longitudinal moving speed of the object.

14. The method of claim 12, wherein
the first condition is determined by determining the information related to a surrounding condition to be the first condition when an area on the road on which the vehicle is being driven, into which the object moves is smaller than a predetermined threshold.

15. The method of claim 12, wherein the first condition is determined by determining the information related to the surrounding condition to be the first condition that there is a guardrail on the road on which the vehicle is being driven or that the road is a highway or freeway.

16. The method of claim 12, wherein the second condition is determined by determining the information related to the surrounding condition to be the second condition when an area on the road on which the vehicle is being driven, into which the object moves, is greater than a predetermined threshold.

17. The method of claim 12, wherein the second condition is determined by determining the information related to the surrounding condition to be the second condition when there is a crosswalk on the road on which the vehicle is being driven or when there is at least one of a sidewalk and a school zone adjacent to the road.

18. The method of claim 12, wherein the changing of the time to send a signal to warn of a collision with the object includes:
changing the time to send a signal to warn of a collision with the object to be later than a predetermined point in time when the collision avoidance control area is reduced, and changing the time to send a signal to warn of a collision with the object to be earlier than the predetermined point in time when the collision avoidance control area is expanded.

19. The method of claim 12, wherein the changing of an amount of braking applied to the vehicle includes:
changing the amount of braking applied to control driving speed of the vehicle to be less than a predetermined value when the collision avoidance control area is reduced, and changing the amount of braking applied to control driving speed of the vehicle to be greater than the predetermined value when the collision avoidance control area is expanded.

20. The method of claim 12, further including:
obtaining information related to the surrounding condition of the road on which the vehicle is being driven.

21. The method of claim 12, further including:
receiving information related to the surrounding condition of the road on which the vehicle is being driven from a Car Ubiquitous System (CUbiS) center.

* * * * *